(12) United States Patent
Peng et al.

(10) Patent No.: US 8,270,096 B2
(45) Date of Patent: Sep. 18, 2012

(54) IMAGE LENS SYSTEM

(75) Inventors: Fang-Ying Peng, Taipei Hsien (TW); Hai-Jo Huang, Taipei Hsien (TW); Sheng-An Wang, Taipei Hsien (TW); Xiao-Na Liu, Guangdong (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 136 days.

(21) Appl. No.: 12/978,338

(22) Filed: Dec. 23, 2010

(65) Prior Publication Data

US 2012/0127583 A1    May 24, 2012

(51) Int. Cl.
*G02B 15/14* (2006.01)
(52) U.S. Cl. ................................. 359/689
(58) Field of Classification Search .............. 359/689
See application file for complete search history.

(56) References Cited

U.S. PATENT DOCUMENTS

2010/0046086 A1   2/2010   Katakura
2011/0096407 A1*  4/2011   Ohata et al. ............ 359/686

FOREIGN PATENT DOCUMENTS

CN           101661157 A      3/2010

* cited by examiner

*Primary Examiner* — William Choi
(74) *Attorney, Agent, or Firm* — Altis Law Group, Inc.

(57) ABSTRACT

An image lens system includes a first lens group that includes a first and a second lens, a movable second lens group that includes a third and a fourth lens, and a third lens group that includes a fifth lens. The image lens system satisfies the formulas: $2.1 \leq Lw/(a*Y) < 2.5$; $1.9 \leq |Fp|/F1| \leq 2.2$; and $0.6 \leq |Fp2/F2| \leq 0.7$, where "Lw" represents the overall length of the image lens system in the wide angle state, "a" represents the ratio of the effective focal length of the image lens system in the telephoto state to that in the wide angle state, "Y" represents the maximum height of image that the image lens system generates, "Fp1" and "Fp2" represents the effective focal lengths of the second and the fourth lenses, "F1" and "F2" represents the effective focal lengths of the first and the second lens groups.

8 Claims, 10 Drawing Sheets

IMAGE LENS SYSTEM

BACKGROUND

1. Technical Field

The disclosure relates to image lens systems and, particularly, to an image lens system with a high resolution and a short overall length.

2. Description of Related Art

In order to obtain a clear image and reduce the size of a camera module, an image lens system of the camera module with high resolution and short overall length are needed. But there is a contradiction between a short overall length of the image lens system and a high resolution of the image lens system. For example, reducing the number of lenses usually shortens the overall length of the image lens system, but resolution of the image lens system will suffer. Conversely, increasing the number of lenses of the image lens system usually increases resolution of the image lens system, but the overall length of the image lens system is increased.

Therefore, it is desirable to provide an image lens system, which satisfies the above-mentioned needs.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will now be described in detail with reference to the drawings.

Figure 1:
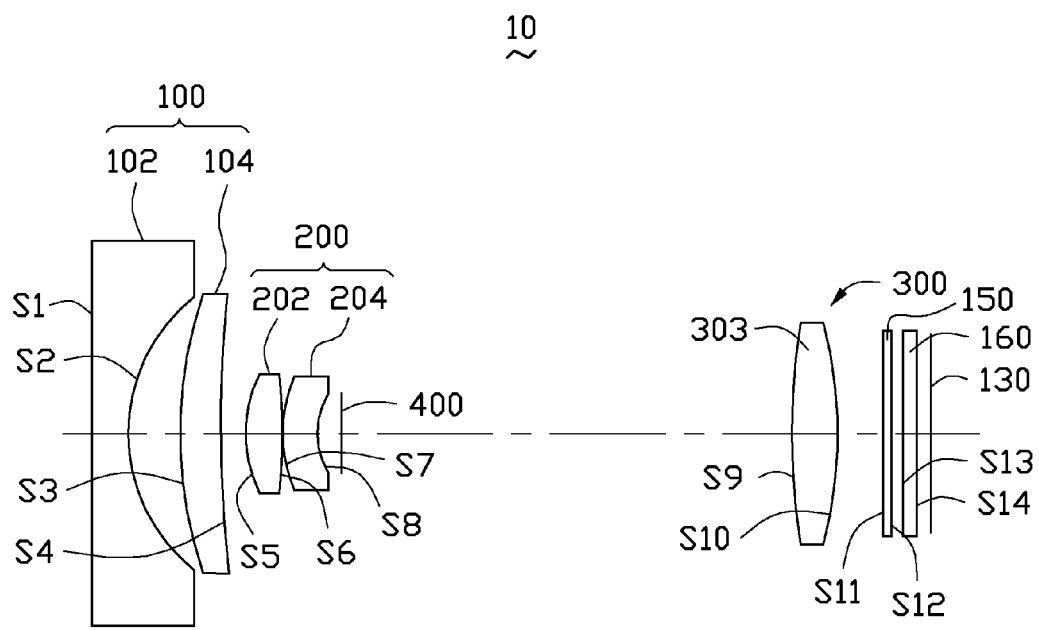
FIG. 1 is a schematic view of an image lens system when the image lens system is in a wide angle state, in accordance with an embodiment.
Figure 2:
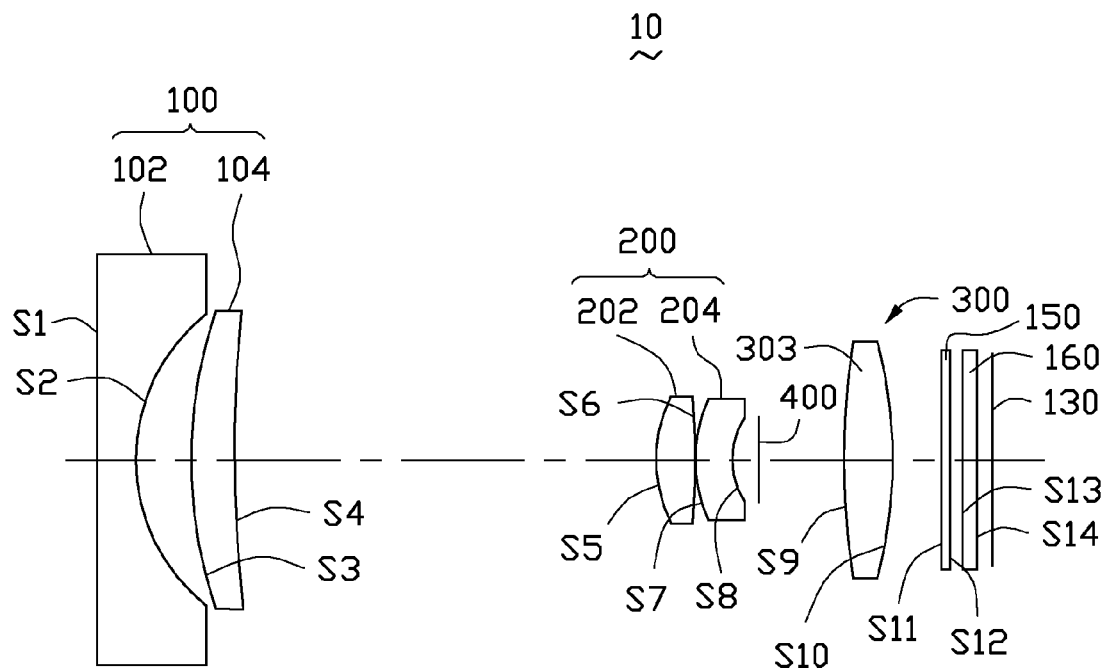
FIG. 2 is a schematic view of the image lens system of FIG. 1 in a telephoto state.

Referring to FIGS. 1 and 2, an image lens system 10, according to an exemplary embodiment, is shown. The image lens system 10 includes, in order from the object side to the image side thereof, a first lens group 100 with negative refraction power, a second lens group 200 with positive refraction power, and a third lens group 300 with positive refraction power. An imaging plane 130 is positioned at the image side of the image lens system 10. When capturing an image, incident light enters the image lens system 10, transmitting through the first lens group 100, the second lens group 200, the third lens group 300, and finally is focused onto the imaging plane 130 where an image sensor (not shown) such as a charge-coupled device (CCD) or a complementary metal oxide semiconductor (CMOS) is located.

The first lens group 100 and the third lens group 300 are fixed. The second lens group 200 is movable. Thereby, the effective focal length of the image lens system 10 can be adjusted by moving the second lens group 200 along the optical axis of the image lens system 10. In particular, the distance between the first lens group 100 and the second lens group 200 along the optical axis of the image lens system 10 increases when the image lens system 10 switches from a wide angle state to a telephoto state.

In this embodiment, the first lens group 100 includes, in the order from the object side to the image side of the image lens system 10, a first lens 102 with negative refraction power and a second lens 104 with positive refraction power. The first lens 102 includes a first surface S1 with negative refraction power, facing the object side, and a second surface S2 with positive refraction power, facing the image side. The second lens 104 includes a third surface S3 with positive refraction power, facing the object side, and a fourth surface S4 with negative refraction power, facing the image side.

The second lens group 200 includes, in the order from the object side to the image side of the image lens system 10, a third lens 202 with positive refraction power and a fourth lens 204 with positive refraction power. The third lens 202 includes a fifth surface S5 with positive refraction power, facing the object side, and a sixth surface S6 with positive refraction power, facing the image side. The fourth lens 204 includes a seventh surface S7 with positive refraction power, facing the object side, and a eighth surface S8 with negative refraction power, facing the image side.

The third lens group 300 includes a fifth lens 303 with positive refraction power. The fifth lens 303 includes a ninth surface S9 with positive refraction power, facing the object side, and a tenth surface S10 with positive refraction power, facing the image side. The first lens group 100, the second lens group 200, and the third lens group 300 are all made of glass.

To ensure that the image lens system 10 have short overall length and high resolution, the image lens system 10 is set to satisfy the following formulas:

$$2.1 \leq Lw/(a*Y) < 2.5; \qquad (1)$$

$$1.9 \leq |Fp1/F1| \leq 2.2; \qquad (2)$$

$$0.6 \leq |Fp2/F2| \leq 0.7.$$

In the formula (1), "Lw" is the overall length of the image lens system 10, that is, the distance along the optical axis of the image lens system 10 from the first surface S1 of the first lens 102 to the imaging plane 130 when it is in the wide angle state, "a" is the zoom ratio of the image lens system 10 which is the ratio of the effective focal length of the image lens system 10 in the telephoto state to that is in the wide angle state, "Y" is the maximum height of the image the image lens system 10 generates, "*" means multiply. When the value of "Lw/(a*Y)" is too low, the aberration is too difficult to fixed. On the contrary, when the value of the "Lw/(a*Y)" is too high, the overall length of the image system 10 is too long. Thus, the formula (1) ensures that the aberration of the image system 10 can be fixed, while the overall length of the image system 10 is short.

In the formula (2), "Fp1" is the effective focal length of the second lens 104. "F1" is the effective focal length of the first lens group 100. When the value of "|Fp1/F1|" is too low, there will be serious field curvature of the image lens system 10. Conversely, when the value of the "|Fp1/F1|" is too high, there will be serious astigmatism of the image lens system 10, which adversely affects the resolution of the image lens system 10. Therefore, the formula (2) keeps the field curvature and the astigmatism in a suitable range.

In the formula (3), "Fp2" is the effective focal length of the fourth lens 204, and "F2" is the effective focal length of the second lens group 200. When the value of "|Fp2/F2|" is too low, there will be serious astigmatism of the image lens system 10. When the value of "|Fp2/F2|" is too high, there will be serious field curvature and chromatic aberration of the image lens system 10. Thus, the formula (3) favorably limits the field curvature and chromatic aberration the of the image lens system 10 in a suitable range.

To balance the overall length, the zoom ratio and the resolution of the image lens system 10, the image lens system 10 further satisfies the formulas:

$$0.65 < M2/Ft < 0.76. \quad (4)$$

$$0.25 < L12t/Ft < 0.3. \quad (5)$$

wherein "M2" is the maximum movement distant of the second lens group 200 along the optical axis when the image lens system 10 moves from the wide angle state to the telephoto state. "L12t" is the distance along the optical axis between the first surface S1 and the fifth surface S5 when the image lens system 10 is in the telephoto state. In addition, "Ft" is the effective focal length of the image lens system 10 in the telephoto state.

To improve the image quality of the image lens system 10, the image lens system 10 further includes an aperture stop 400 arranged between the second lens group 200 and the third lens group 300, a filter 150 next to the third lens group 300, and a glass cover 160 next to the imaging plane 130. In one embodiment, the aperture stop 400 is arranged on the eighth surface S8 of the second lens group 200 and moves with the second lens group 200. The aperture stop 400 is configured for adjusting light flux from the second lens group 200 to the third lens group 300, thus to facilitate uniform light transmission to correct coma aberrations of the image lens system 10. The filter 150 includes an eleventh surface S11 facing the object side and a twelfth surface S12 facing the image side. The glass cover 160 includes a thirteenth surface S13 facing the object side and a fourteenth surface S14 facing the image side.

Detailed examples of the image lens system 10 are given below. But it should be noted that the image lens system 10 is not limited to these examples. Listed below are the symbols used in the detailed examples:

R: radius of curvature;
D: distance between two adjacent lens surfaces along the optical axis of the image lens system 10, wherein the unit is millimeter;
Nd: refractive index of lens with respect to the d light;
v: Abbe constant;
Conic: coin constant.

Table 1 shows the lens data of the present example.

TABLE 1

| Lens surfaces | Type | R | D | nd | Vd | Conic |
|---|---|---|---|---|---|---|
| S1 | Spherical | 114.4 | 0.7 | 1.7725 | 49.62 | — |
| S2 | Spherical | 5.52 | 1.613 | — | — | — |
| S3 | Aspheric | 10.86 | 1.32 | 1.8466 | 23.78 | 1.891247 |
| S4 | Aspheric | 22.199 | 12.428 | — | — | 1.371508 |
| S5 | Aspheric | 3.45 | 1.1417 | 1.7433 | 49.325 | −3.38292 |
| S6 | Aspheric | −29.0738 | 0.066 | — | — | −147.4572 |
| S7 | Spherical | 5.51 | 0.989 | 1.9228 | 20.884 | — |
| S8 | Spherical | 2.42 | 0.558 | — | — | — |
| Aperture stop | — | Infinity | 3.36 | — | — | — |
| S9 | Spherical | 23.815 | 1.3667 | 1.6967 | 56.42 | — |
| S10 | Spherical | −14.8019 | 1.952 | — | — | — |
| S11 | — | Infinity | 0.3 | 1.5168 | 64.167 | — |
| S12 | — | Infinity | 0.3 | — | — | — |
| S13 | — | Infinity | 0.5 | 1.5168 | 64.167 | — |
| S14 | — | Infinity | 0.4 | — | — | — |
| Imaging plane | — | Infinity | — | — | — | — |

The third surface S3, the fourth surface S4, the fifth surface S5, and the sixth surface are aspheric surfaces. The aspheric surfaces are shaped according to the formula.

$$x = \frac{ch^2}{1 + \sqrt{1 - (k+1)c^2h^2}} + \sum A_i h^i$$

wherein "h" is a height from the optical axis of the zoom lens system 100 to the aspheric surface, "c" is a vertex curvature, "k" is a conic constant, and "Ai" is i-th order correction coefficients of the aspheric surfaces. Table 2 lists the aspheric coefficients of the lens surfaces of the second lens 104 and the third lens 202.

TABLE 2

| | S3 | S4 | S5 | S6 |
|---|---|---|---|---|
| A4 | −5.50292627E−04 | −7.79519566E−04 | 7.61616608E−03 | 1.79622017E−04 |
| A6 | −3.90081893E−05 | −3.17852908E−05 | −5.01392006E−04 | 5.94625391E−04 |
| A8 | 2.22517662E−06 | 2.57527394E−06 | −4.92792716E−05 | −6.00809753E−04 |
| A10 | −3.29480912E−08 | −1.09806363E−07 | 4.20706002E−05 | 2.90545574E−04 |
| A12 | −8.88537388E−11 | 6.05255361E−09 | −1.02950127E−05 | −7.29529150E−05 |

TABLE 2-continued

|     | S3              | S4              | S5              | S6              |
|-----|-----------------|-----------------|-----------------|-----------------|
| A14 | 1.18244619E−10  | −1.85306142E−10 | 1.42880302E−06  | 9.23481619E−06  |
| A16 | −5.75716349E−12 | −6.48843465E−13 | −1.01939687E−07 | −4.81524134E−07 |

Table 3 lists the distance between each lens group when the image lens 10 is at the wide angle state and the telephoto state.

TABLE 3

| state            | f    | D4     | D9      | D11    |
|------------------|------|--------|---------|--------|
| Wide angle state | 4.2  | 12.428 | 3.3613  | 1.9525 |
| Telephoto state  | 15.7 | 0.6815 | 14.3095 | 1.439  |

Wherein "f" is the effective focal length of the image lens system 10, "D7" is the distance on the optical axis between the first lens group 100 and the second lens group 200, that is the distance on the optical axis between the fourth surface S4 and the fifth surface S5, "D9" is the distance on the optical axis between the second lens group 200 and the third lens group 300, that is the distance on the optical axis between the aperture stop 400 and the ninth surface S9, "D11" is the distance on the optical axis between the third lens group 300 and the filter 150, that is the distance on the optical axis between the fifth lens 303 and the filter 150.

Figure 3:
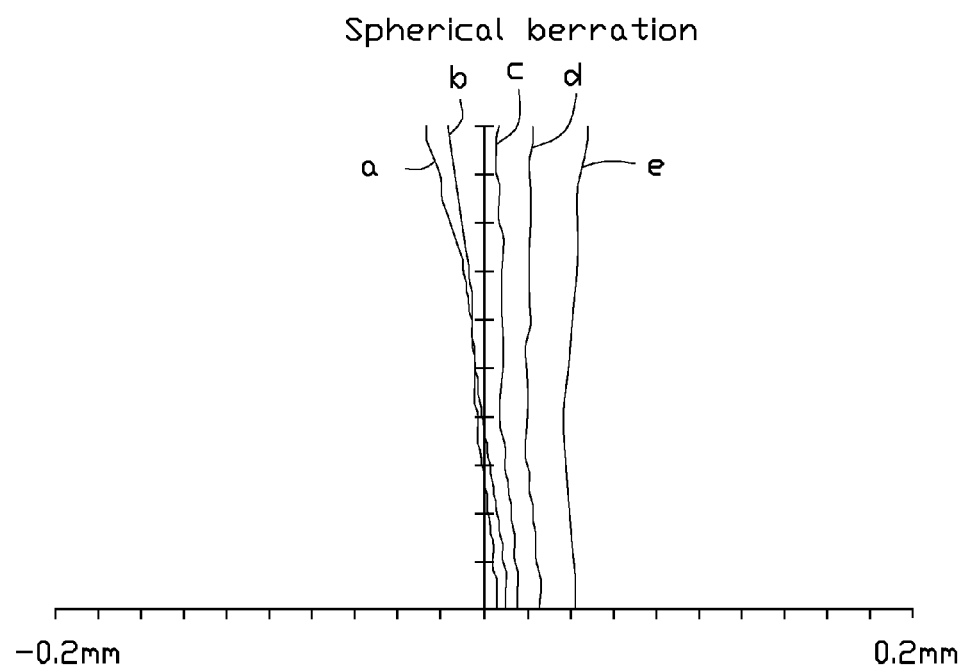
FIGS. 3-6 are graphs respectively showing spherical aberration, field curvature, distortion, and lateral chromatic aberration occurring in the image lens system of FIG. 1 when the image lens system is in the wide angle state.
Figure 4:
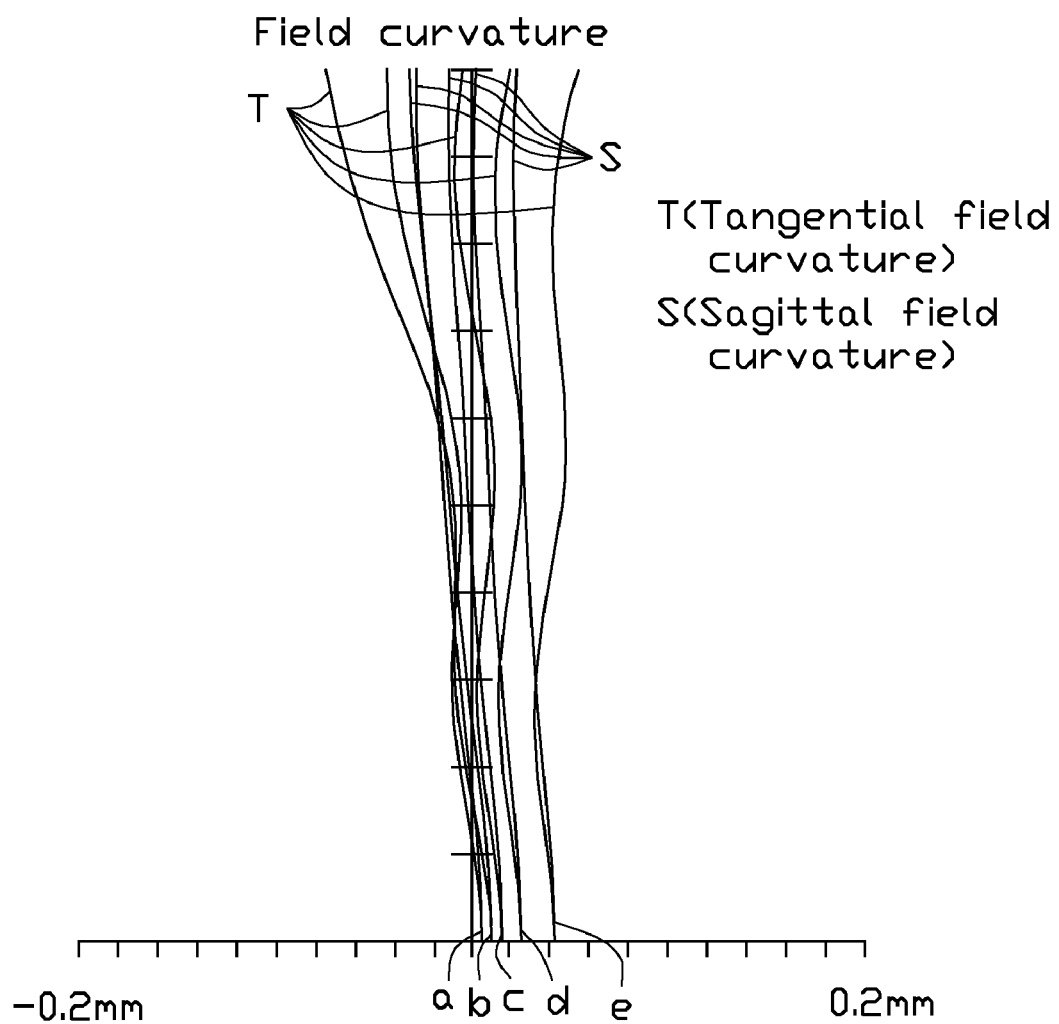
Figure 5:
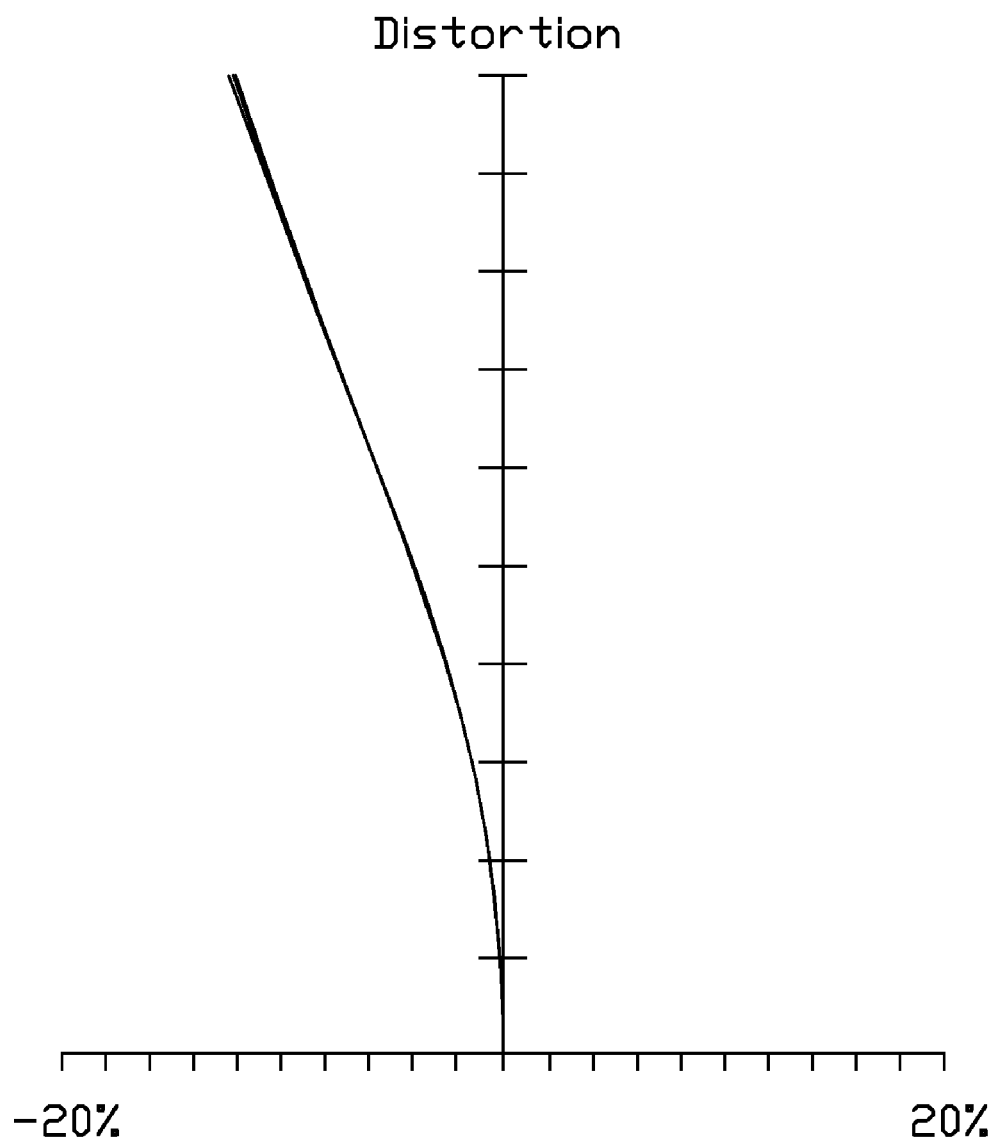
Figure 6:
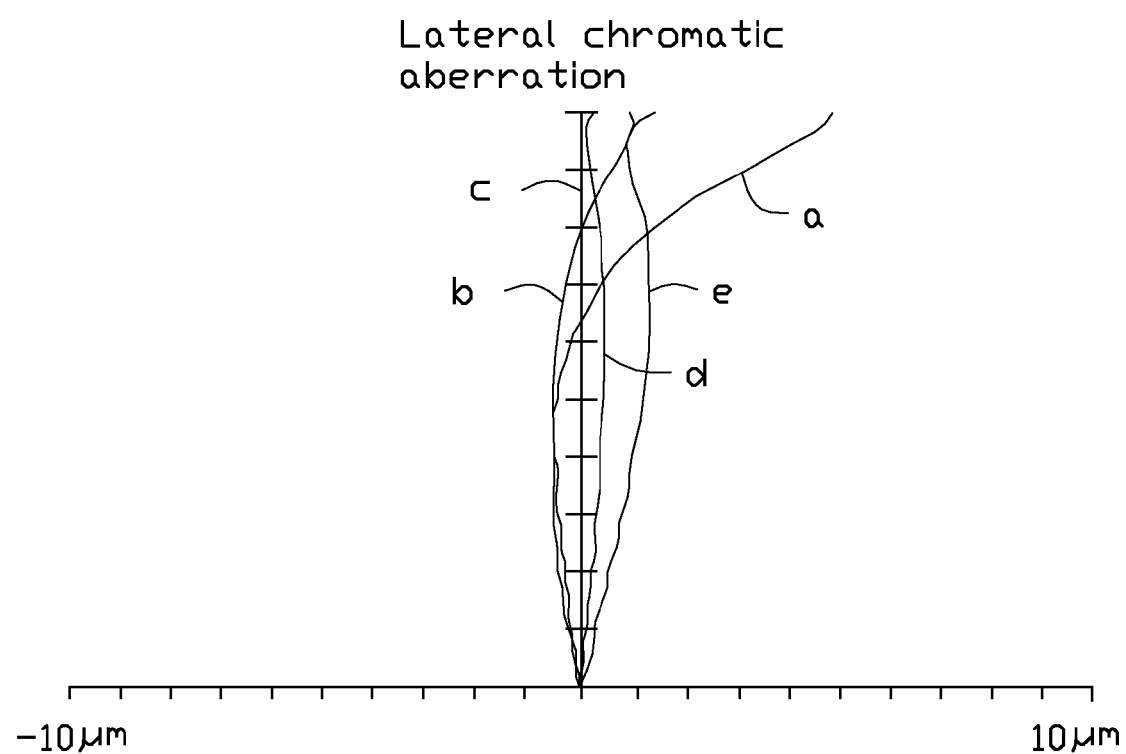
Figure 7:
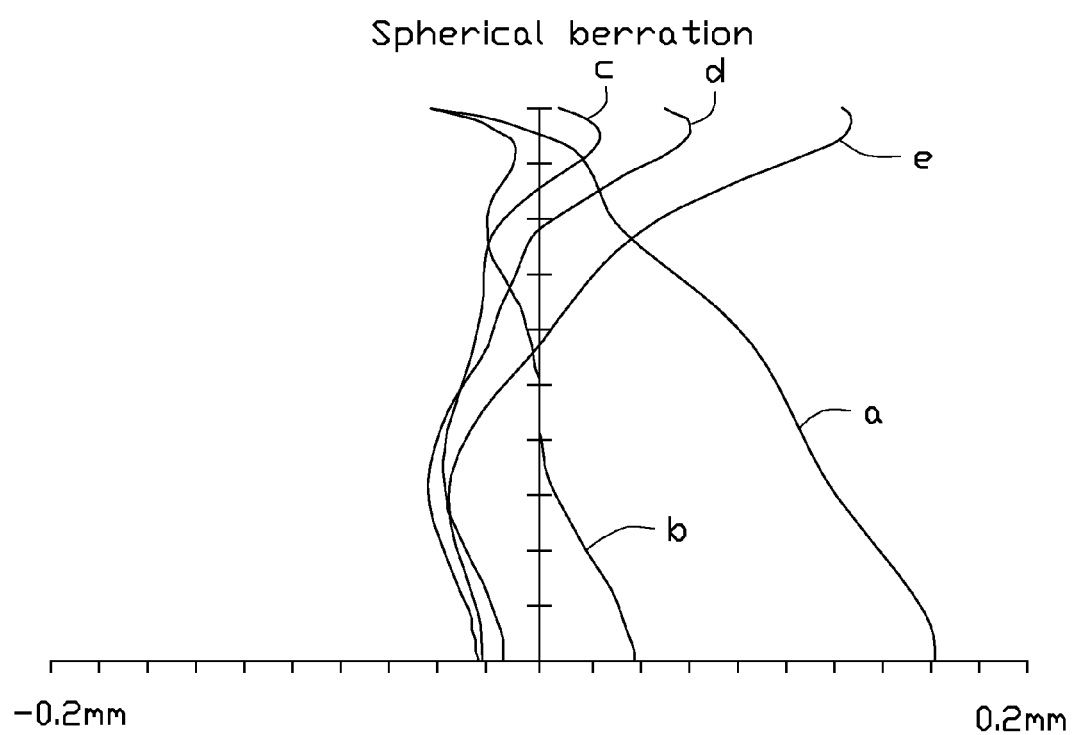
FIGS. 7-10 are graphs respectively showing spherical aberration, field curvature, distortion, and lateral chromatic aberration occurring in the image lens system of FIG. 1 when the image lens system is in the telephoto state.
Figure 8:
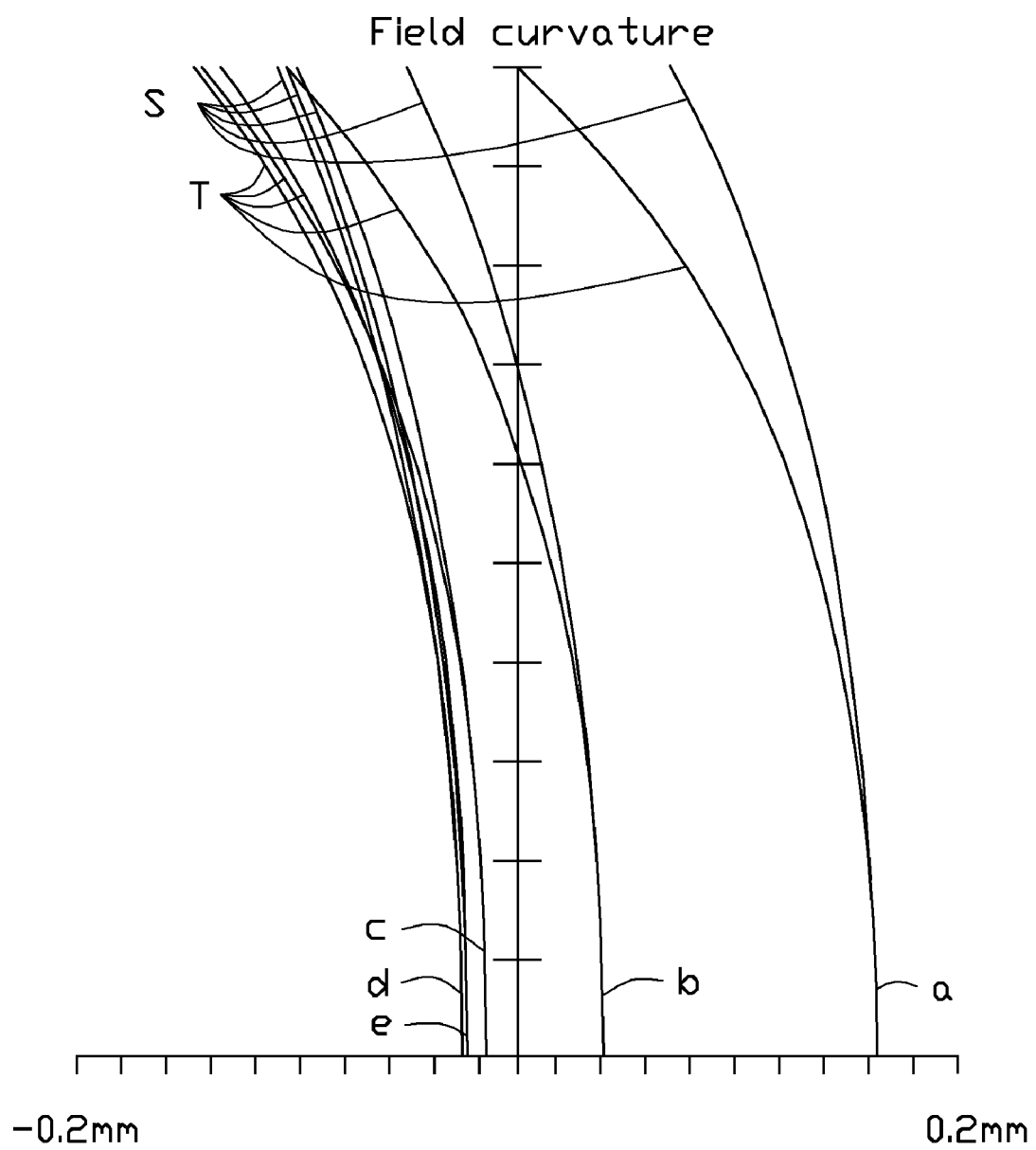
Figure 9:
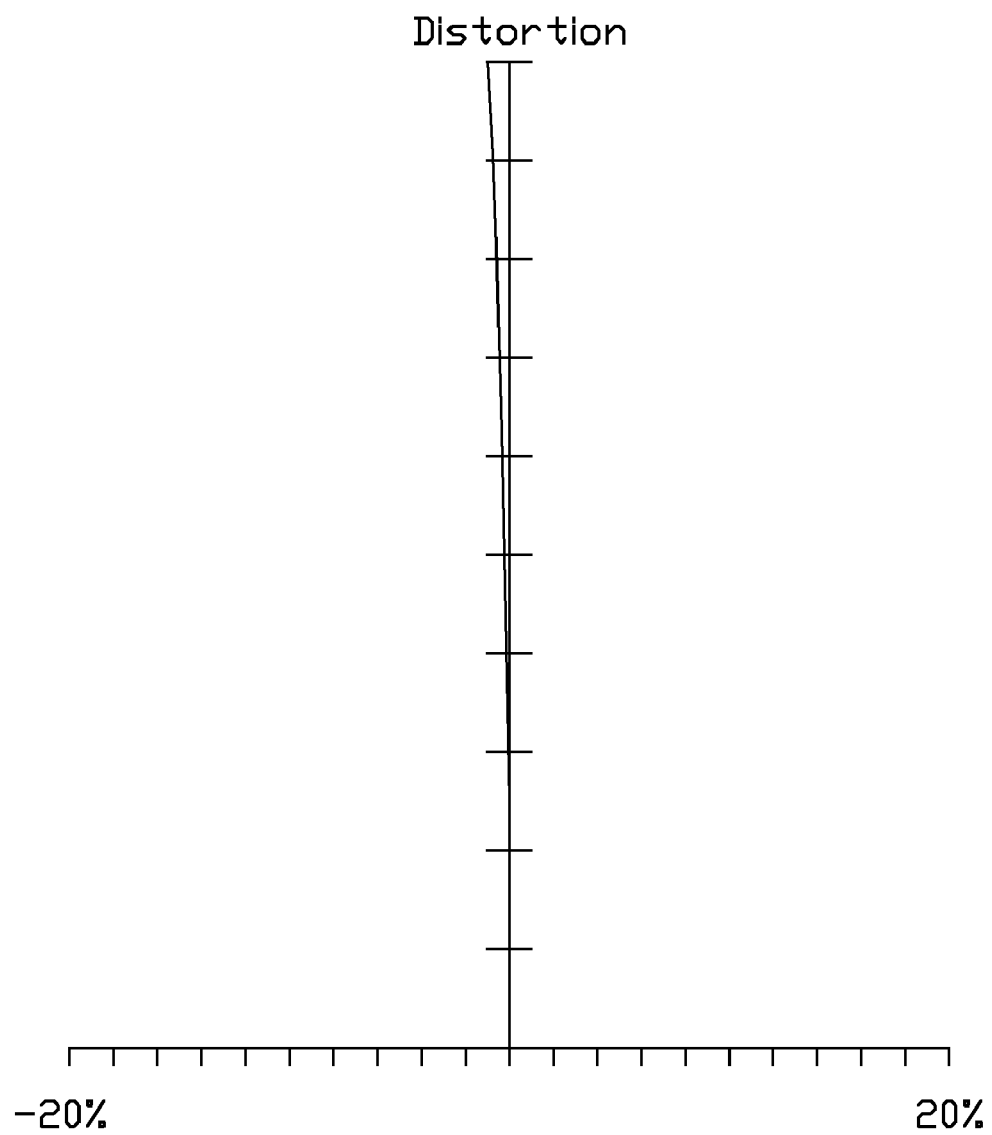
Figure 10:
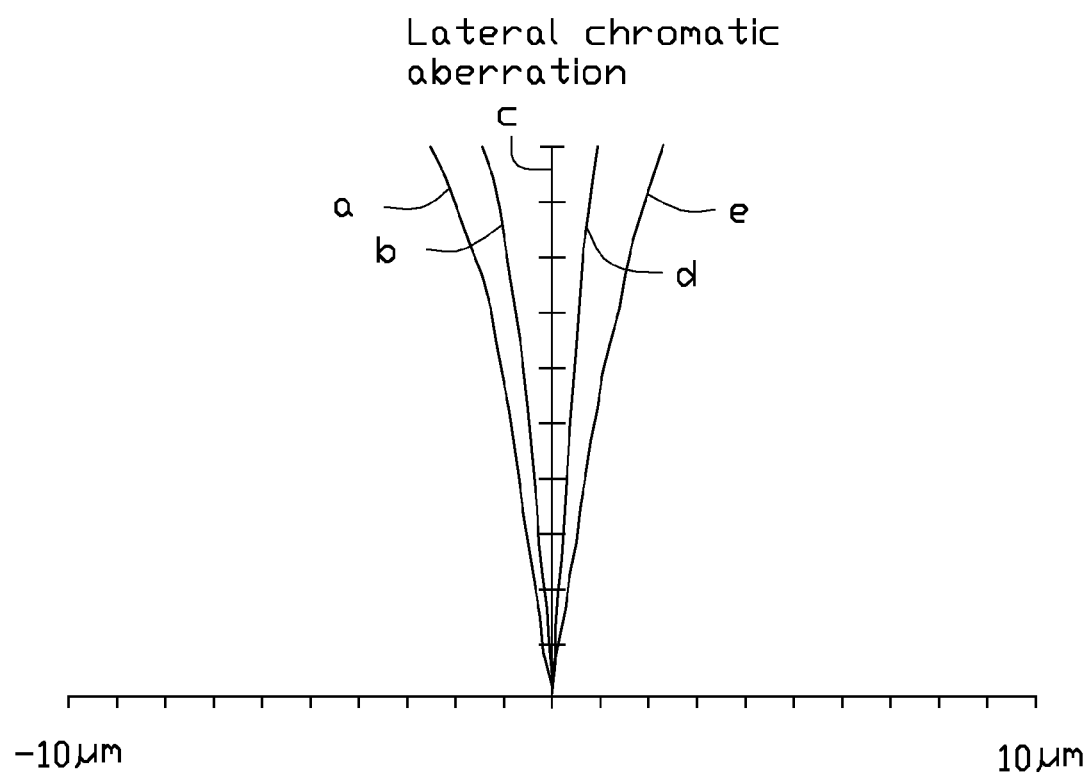

The spherical aberration, field curvature, distortion, and lateral chromatic aberration of the image lens system 10 when it is in the wide angle state and the telephoto state is shown in FIGS. 3-10, wherein the curves "a", "b", "c", "d", and "e" respectively represent the lights of wavelengths of 436 nm, 486 nm, 546 nm, 588 nm, and 656 nm. Referring to FIGS. 3 and 7, the spherical aberration of the image lens system 10 is between −0.2 mm to 0.2 mm. Referring to FIGS. 4 and 8, the tangential field curvature and the sagittal field curvature of the image lens system 10 is between −0.2 mm to 0.2 mm. Referring to FIGS. 5 and 9, the distortion of the image lens system 10 is between −14% to 14%. Referring to FIGS. 6 and 10, the lateral chromatic aberration of the image lens system 10 is between −5 µm~5 µm.

It will be understood that the above particular embodiments is shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An image lens system, in order from an object side to an image side thereof, comprising:
a first lens group with negative refraction power, wherein the first lens group comprises a first lens with negative refraction power and a second lens with positive refraction power;
a second lens group with positive refraction power wherein the second lens group comprises a third lens with positive refraction power and a fourth lens with positive refraction power; and
a third lens group with positive refraction power, wherein the third lens group comprises a fifth lens with positive refraction power;
wherein the first lens group and the third lens group are positioned immovably along the optical axis of the image lens system, the second lens group is positioned movably along the optical axis of the image lens system; the image lens system satisfies the following formulas:

$2.1 \leq Lw/(a*Y) < 2.5$;

$1.9 \leq |Fp1/F1| \leq 2.2$; and $0.6 \leq |Fp2/F2| \leq 0.7$, where "Lw" represents the overall length of the image lens system when the image lens system is in the wide angle state, "a" represents the zoom ratio of the image lens system which is the ratio of the effective focal length of the image lens system in the telephoto state to that is in the wide angle state, "Y" represents the maximum height of image that the image lens system generates, "Fp1" represents the effective focal length of the second lens, "F1" represents the effective focal length of the first lens group, "Fp2" represents the effective focal length of the fourth lens, "F2" represents the effective focal length of the second lens group.

2. The image lens system of claim 1, wherein the distance between the first lens group and the second lens group along the optical axis of the image lens system increases when the image lens system switches from a wide angle state to a telephoto state.

3. The image lens system of claim 1, wherein the image lens system further satisfies the formula: $0.65 < M2/Ft < 0.76$; and $0.25 < L12t/Ft < 0.3$, where "M2" represents the maximum movement distant of the second lens group along the optical axis when the image lens system moves from the wide angle state to the telephoto state, "L12t" represents the distance along the optical axis between a surface of the first lens that faces the image side to a surface of the third lens that faces the object side when the image lens system is in the telephoto state, "Ft" is the effective focal length of the image lens system in the telephoto state.

4. The image lens system of claim 1, wherein the first lens comprises a first surface with negative refraction power, facing the object side, and a second surface with positive refraction power, facing the image side; the second lens comprises a third surface with positive refraction power, facing the object side, and a fourth surface with negative refraction power, facing the image side.

5. The image lens system of claim 1, wherein the third lens comprises a fifth surface with positive refraction power, facing the object side, and a sixth surface with positive refraction power, facing the image side; the fourth lens comprises a seventh surface with positive refraction power, facing the object side, and a eighth surface with negative refraction power, facing the image side.

6. The image lens system of claim 1, wherein the fifth lens comprises a ninth surface with positive refraction power, facing the object side, and a tenth surface with positive refraction power, facing the image side.

7. The image lens system of claim 1, wherein the image lens system further comprises a aperture stop arranged between the second lens group and the third lens group, a filter next to the third lens group, and a glass cover next to the filter; the aperture stop is arranged on the fourth lens of the second lens group and capable of moving with the second lens group.

8. The image lens system of claim 1, wherein the first lens group, the second lens group, and the third lens group are made of glass.

* * * * *